US012763664B2

(12) United States Patent
Lee et al.

(10) Patent No.: US 12,763,664 B2
(45) Date of Patent: Oct. 13, 2026

(54) METHOD FOR INITIAL CHARGING OF DC/DC CONVERTER STATION WITH INPUT SERIES OUTPUT PARALLEL STRUCTURE

(71) Applicant: HD HYUNDAI ELECTRIC CO., LTD., Seongnam-si (KR)

(72) Inventors: Seung Ho Lee, Seongnam-si (KR); Jong Won Lee, Seongnam-si (KR); Seung Hwan Kim, Seongnam-si (KR); Young Ho Park, Seongnam-si (KR)

(73) Assignee: HD HYUNDAI ELECTRIC CO., LTD., Seongnam-si (KR)

( * ) Notice: Subject to any disclaimer, the term of this patent is extended or adjusted under 35 U.S.C. 154(b) by 0 days.

(21) Appl. No.: 19/548,911

(22) Filed: Feb. 24, 2026

(65) Prior Publication Data

US 2026/0189127 A1 Jul. 2, 2026

Related U.S. Application Data

(63) Continuation-in-part of application No. PCT/KR2025/004911, filed on Apr. 11, 2025.

(30) Foreign Application Priority Data

Jul. 3, 2024 (KR) ........................ 10-2024-0087223
Nov. 21, 2024 (KR) ........................ 10-2024-0167071

(51) Int. Cl.
*H02M 1/00* (2006.01)
*H02J 7/06* (2006.01)
(Continued)

(52) U.S. Cl.
CPC ............. *H02M 1/0074* (2021.05); *H02J 7/06* (2013.01); *H02J 7/933* (2026.01); *H02J 7/96* (2026.01);
(Continued)

(58) Field of Classification Search
CPC .... H02M 1/0074; H02M 3/33584; H02J 7/06; H02J 7/933; H02J 7/96; H02J 2207/20
See application file for complete search history.

(56) References Cited

U.S. PATENT DOCUMENTS 12,311,789 B2 * 5/2025 Saborido Rodriguez .................... B60L 53/20
2016/0322917 A1 11/2016 Matsuoka et al.
(Continued)

FOREIGN PATENT DOCUMENTS

JP H1198845 A 4/1999
JP 2009232502 A 10/2009
(Continued)

OTHER PUBLICATIONS

International Search Report—PCT/KR2025/004911 dated Jul. 14, 2025.

*Primary Examiner* — Emily P Pham
(74) *Attorney, Agent, or Firm* — CANTOR COLBURN LLP

(57) ABSTRACT

Provided is a DC/DC converter station having an input series-output parallel structure. The converter includes: a plurality of DC converters with input terminals connected to each other in series and output terminals connected to each other in parallel; an auxiliary power supply connected to at least one secondary-side conversion unit among the plurality of DC converters and supplying initial charging power; and a control unit controlling the auxiliary power supply and performing initial charging of the converter station. The control unit is configured to charge a secondary-side capacitor within the secondary-side conversion unit via the auxiliary power supply and to charge a primary-side capacitor within a primary-side conversion unit within the DC con-
(Continued)

verter via a transformer within the DC converter based on voltage of the secondary-side capacitor.

8 Claims, 5 Drawing Sheets

(51) Int. Cl.
*H02J 7/90* (2026.01)
*H02J 7/96* (2026.01)
*H02M 3/335* (2006.01)

(52) U.S. Cl.
CPC ...... *H02J 2207/20* (2020.01); *H02M 3/33584* (2013.01)

(56) References Cited

U.S. PATENT DOCUMENTS

| | | | |
|---|---|---|---|
| 2022/0302848 | A1 | 9/2022 | Yu et al. |
| 2022/0416684 | A1 | 12/2022 | Awal et al. |

FOREIGN PATENT DOCUMENTS

| | | | |
|---|---|---|---|
| JP | 2015195722 | A | 11/2015 |
| KR | 20130047963 | A | 5/2013 |
| KR | 20130072951 | A | 7/2013 |
| KR | 20180044036 | A | 5/2018 |
| KR | 20180087681 | A | 8/2018 |
| KR | 101915888 | B1 | 11/2018 |
| KR | 20190043733 | A | 4/2019 |
| WO | 2013094886 | A1 | 6/2013 |

* cited by examiner

METHOD FOR INITIAL CHARGING OF DC/DC CONVERTER STATION WITH INPUT SERIES OUTPUT PARALLEL STRUCTURE

TECHNICAL FIELD

The present disclosure relates to a method for initial charging of a direct current (DC)/DC converter station having an input series-output parallel structure. More specifically, the present disclosure relates to a method for charging a medium voltage DC/DC converter station having an input series-output parallel structure as the method for charging a medium voltage-side capacitor by connecting an auxiliary power supply to the low voltage side.

BACKGROUND ART

To meet growing global demand for electricity and to ensure a stable and sustainable power supply, the need for power grid reinforcement and reform is growing. MVDC/LVDC converter stations, which link medium voltage (MV) DC (MVDC) voltage with low voltage (LV) DC (LVDC) voltage, have a modular structure that connects multiple power electronic building blocks (PEBBs) in series and parallel to convert MVDC voltage to LVDC voltage.

MVDC/LVDC converter stations may utilize an Input Series Output Parallel (ISOP) structure to deliver stable, high output, and secure high connectivity and safety by adopting a bidirectional insulated structure.

However, if an MVDC/LVDC converter station with an Input Series Output Parallel structure has a high input voltage and the MVDC input power is applied without initial charging of the input-terminal capacitor, a very large inrush current may occur, resulting in occurrence of converter damage. Therefore, a method for charging the input capacitor to prevent inrush current and damage to the converter is required.

DISCLOSURE OF INVENTION

Technical Problem

An aspect of the present disclosure is to provide a method for initial charging of a DC/DC converter station with an input series-output parallel structure.

Another aspect of the present disclosure is to provide a method for initial charging of a DC/DC converter station, in which inrush current may be limited using a separate power supply.

Another aspect of the present disclosure is to provide a method for initial charging of a DC/DC converter station, in which it is less expensive and the size of the converter station may also be reduced as compared to charging using a wireless power transmission device.

The technical problems to be achieved by the present disclosure are not limited to the technical problems mentioned above, and other technical problems not mentioned above will be clearly understood by those skilled in the art from the following description.

Solution to Problem

According to an aspect of the present disclosure, a method for initial charging of a direct current (DC)/DC converter station with an input series-output parallel structure includes applying auxiliary power supply to a secondary-side conversion unit of a DC converter within the converter station and charging a secondary-side capacitor within the secondary-side conversion unit, sensing a charge amount of voltage of the secondary-side capacitor, charging a primary-side capacitor within a primary-side conversion unit of the DC converter through a transformer within the DC converter based on a result of sensing the charge amount of the voltage of the secondary-side capacitor, sensing a charge amount of voltage of the primary-side capacitor, and applying a grid voltage to the converter station based on a result of sensing the charge amount of the voltage of the primary-side capacitor. In the applying the grid voltage, the grid voltage may be applied only when a magnitude of the voltage of the primary-side capacitor is equal to a value obtained by dividing the grid voltage by a number of DC converters within the converter station.

In the method for initial charging of a DC/DC converter station, the charging the secondary-side capacitor may be performed such that the secondary-side capacitor is charged by limiting inrush current through an initial charging resistor connected to the auxiliary power supply in series.

In the method for initial charging of a DC/DC converter station, the charging the primary-side capacitor may include, when the voltage of the secondary-side capacitor is equal to a voltage magnitude of the auxiliary power supply, transferring power from the secondary-side conversion unit to the primary-side conversion unit via the transformer, and charging the primary-side capacitor using the transferred power, and the primary-side capacitor may be charged by limiting inrush current through soft switching.

In the method for initial charging of a DC/DC converter station, the applying the grid voltage may be performed such that, when the magnitude of the voltage of the primary-side capacitor is lower than the value obtained by dividing the grid voltage by the number of the DC converters in the converter station, the voltage of the primary-side capacitor may be boosted through a power transfer by the transformer until the magnitude of the voltage of the primary-side capacitor becomes equal to the value obtained by dividing the grid voltage by the number of the DC converters in the converter station.

According to another aspect of the present disclosure, a DC/DC converter station having an input series-output parallel (ISOP)) structure includes a plurality of DC converters with input terminals connected to each other in series and output terminals connected to each other in parallel; an auxiliary power supply connected to at least one secondary-side conversion unit among the plurality of DC converters and supplying initial charging power; and a control unit controlling the auxiliary power supply and performing initial charging of the converter station. The control unit may be configured to charge a secondary-side capacitor within the secondary-side conversion unit via the auxiliary power supply and to charge a primary-side capacitor within a primary-side conversion unit within the DC converter via a transformer within the DC converter based on voltage of the secondary-side capacitor.

In the DC/DC converter station, the auxiliary power supply may be connected to an initial charging resistor for limiting inrush current in series.

In the DC/DC converter station, the control unit may be configured to disconnect the auxiliary power supply from the converter station and apply grid voltage based on completion of charging of the primary-side capacitor.

In the DC/DC converter station, the control unit may be configured to boost voltage of the primary-side capacitor through power transfer by the transformer until a voltage magnitude of the primary-side capacitor becomes equal to a value obtained by dividing the grid voltage by a number of DC converters in the converter station, when the voltage magnitude of the primary-side capacitor is lower than a value obtained by dividing a magnitude of the grid voltage by the number of the DC converters in the converter station.

The features of the present disclosure, briefly summarized above, are merely illustrative aspects of the detailed description of the present disclosure described below and do not limit the scope of the present disclosure.

Advantageous Effects of Invention

According to an aspect of the present disclosure, a method for initial charging of a DC/DC converter station with an input series-output parallel structure may be provided.

Furthermore, according to the present disclosure, a method for initial charging of a DC/DC converter station may be provided, in which inrush current may be limited using a separate power supply.

Furthermore, according to the present disclosure, a method for initial charging of a DC/DC converter station may be provided, in which it may be less expensive and the size of the converter station may also be reduced as compared to charging using a wireless power transmission device.

The effects obtained by the present disclosure are not limited to the effects described above, and other effects not mentioned will be clearly understood by those skilled in the art from the following description.

MODE FOR THE PRESENT DISCLOSURE

Figure 1:
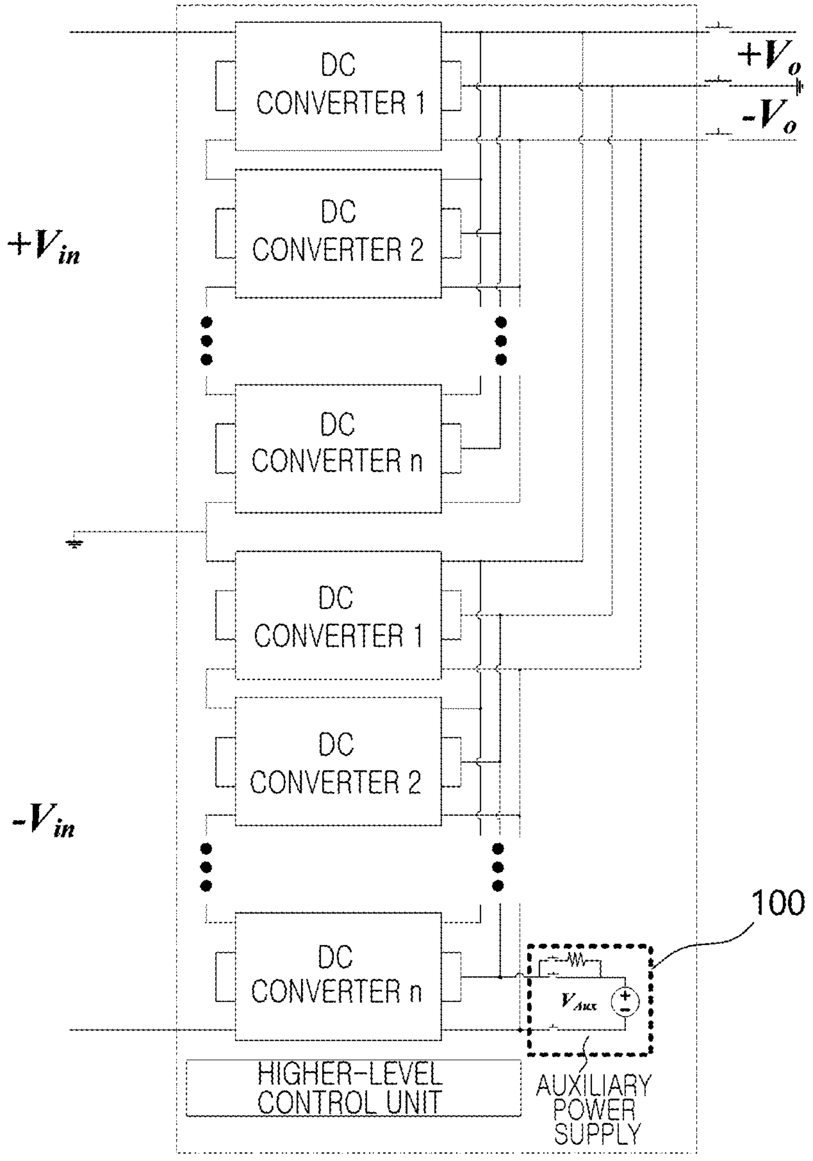
FIG. 1 is a diagram illustrating auxiliary power supply installed in a DC/DC converter station with an input series-output parallel structure according to an embodiment of the present disclosure.

Hereinafter, embodiments of the present disclosure will be described in detail with reference to the attached drawings so that those skilled in the art may easily implement the present disclosure. However, the present disclosure may be implemented in various different forms and is not limited to the embodiments described herein.

In describing embodiments of the present disclosure, detailed descriptions of well-known structures or functions will be omitted if they are deemed to obscure the gist of the present disclosure. Furthermore, portions irrelevant to the description of the present disclosure in the drawings have been omitted, and similar parts have been designated with similar reference numerals.

In the present disclosure, when a component is said to be "connected," "coupled," or "connection" to another component, this includes not only a direct connection but also an indirect connection where another component exists therebetween. Furthermore, when a component is said to "include" or to "have" another component, unless otherwise stated, this does not exclude the other component but rather implies the inclusion of another component.

In the present disclosure, terms such as "first," "second," and the like are used solely to distinguish one component from another, and unless specifically stated, do not limit the order, importance of components, or the like. Therefore, within the scope of the present disclosure, a "first" component in an embodiment may be referred to as a "second" component in another embodiment, and similarly, a "second" component in an embodiment may be referred to as a "first" component in another embodiment.

In the present disclosure, the distinction between components is intended to clearly illustrate their respective characteristics and does not necessarily imply that the components are separate. In other words, multiple components may be integrated into a single hardware or software unit, or a single component may be distributed into multiple hardware or software units. Therefore, even if not specifically mentioned, such integrated or distributed embodiments are also included within the scope of the present disclosure.

In the present disclosure, the components described in various embodiments are not necessarily essential components, and some may be optional components. Therefore, embodiments comprised of a subset of the components described in an embodiment are also included within the scope of the present disclosure. Additionally, embodiments that include other components in addition to the components described in the various embodiments are also included within the scope of the present disclosure.

Hereinafter, a method for initial charging of a DC/DC converter station with an input series-output parallel structure according to an embodiment of the present disclosure will be described with reference to the respective drawings.

FIG. 1 is a diagram illustrating an auxiliary power supply installed in a DC/DC converter station with an input series-output parallel structure according to an embodiment of the present disclosure.

Referring to FIG. 1, an MVDC/LVDC converter station, which links a medium voltage (MV) DC (MVDC) voltage and a low voltage (LV) DC (LVDC) voltage, is shown, and to convert the MVDC voltage to an LVDC voltage while stably generating high output, it can be confirmed that multiple power electronic building blocks (PEBBs) are connected in series and parallel. At this time, in FIG. 1, the input side (Vin) may be a medium voltage, and the output side (Vo) may be a low voltage.

The converter station illustrated in FIG. 1 may comprise multiple DC converters that convert a voltage distributed from a high-voltage input voltage (Vin) into DC-DC. Since the input sides are connected in series, the input voltage value of each DC converter may be the value obtained by dividing the input voltage (Vin) by the number of DC converters (n, where n is a natural number). Furthermore, since the output sides are connected in parallel, the output voltage values of respective DC converters may all be the same.

Referring to FIG. 1, it can be confirmed that an auxiliary power supply (100) is connected to the output unit (low voltage side) of the nth (where n is a natural number) DC converter. It can be confirmed that the voltage source of the auxiliary power supply has a voltage value of Vaux and is connected in series with a resistor.

Figure 2:
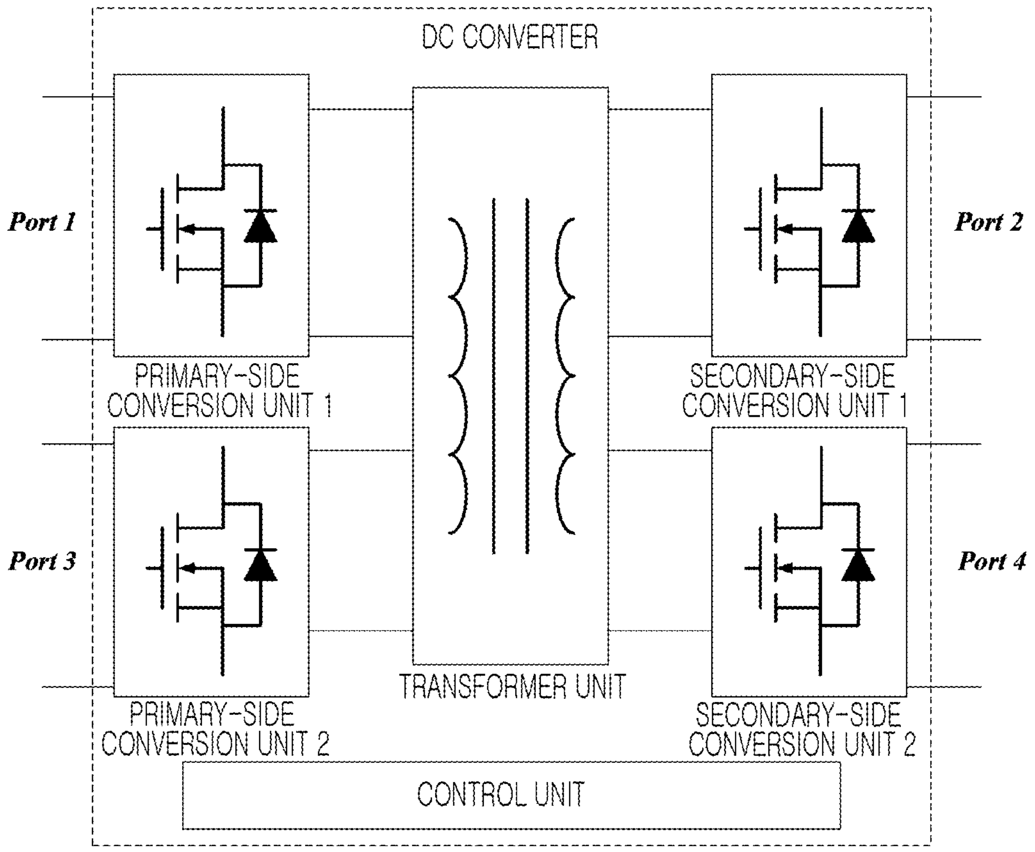
FIG. 2 is a diagram illustrating a DC converter according to an embodiment of the present disclosure.

FIG. 2 is a diagram illustrating a DC converter according to an embodiment of the present disclosure.

The DC converter illustrated in FIG. 2 may be a converter corresponding to one of the multiple DC converters illustrated in FIG. 1. Referring to FIG. 2, a schematic diagram of a DC converter is illustrated. The DC converter may include a primary-side conversion unit that converts a distributed DC input voltage into a first alternating current (AC) voltage, a transformer unit including a transformer that converts the first AC voltage into a second AC voltage according to the turns ratio of a multi-winding transformer, a secondary-side conversion unit that converts the second AC voltage back into a DC output voltage, and a higher-level control unit that controls the overall operation of the DC converter.

Figure 3:
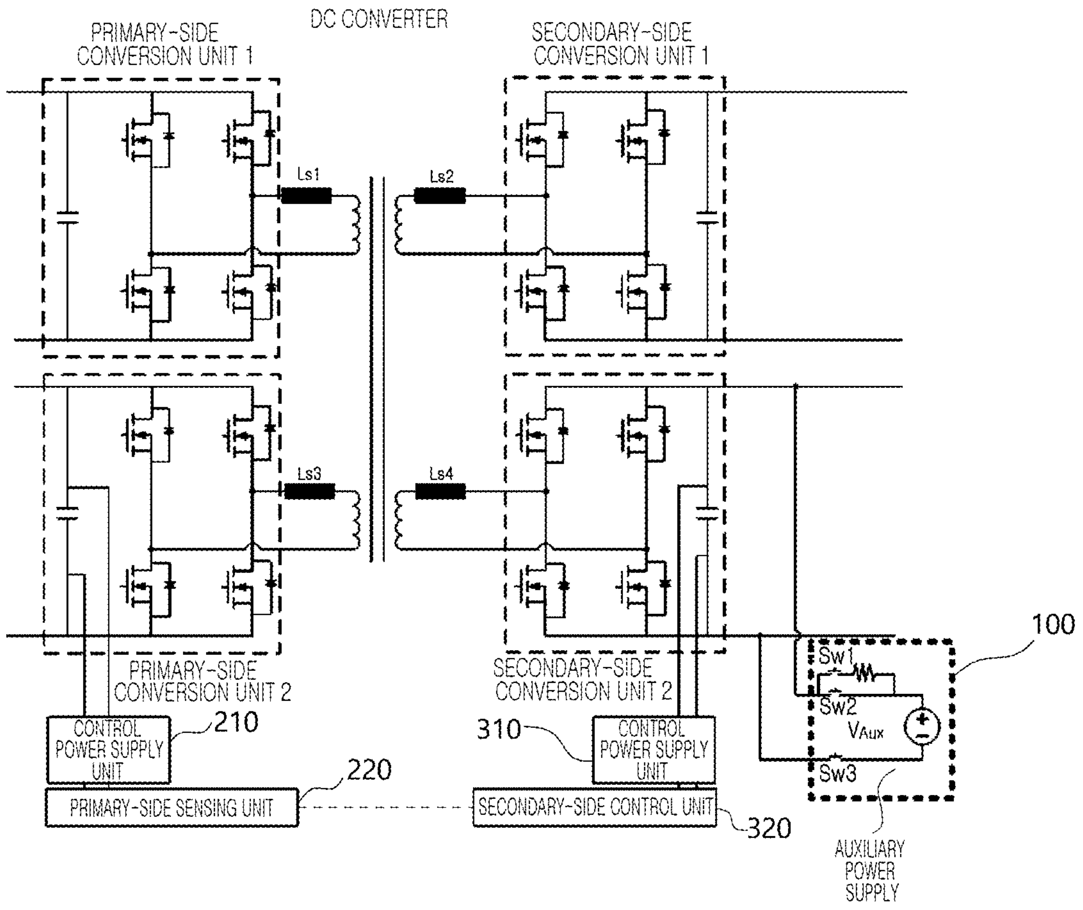
FIG. 3 is a diagram illustrating an internal circuit diagram of a DC converter and an auxiliary power supply connected thereto according to an embodiment of the present disclosure.

FIG. 3 is a diagram illustrating an internal circuit of a DC converter and an auxiliary power supply connected thereto according to an embodiment of the present disclosure.

Referring to FIG. 3, a detailed internal circuit diagram of the DC converter illustrated in FIG. 2 is illustrated. In addition to the primary-side conversion unit and the secondary-side conversion unit, the DC converter may include a primary-side control power supply unit (210), a primary-side sensing unit (220), a secondary-side control power supply unit (310), and a secondary-side control unit (320). At this time, the auxiliary power (100) may be applied to the secondary-side control power supply unit (310).

The higher-level control unit described in FIG. 2 may be divided into a primary-side sensing unit (220) and a secondary-side control unit (320) to ensure isolation, and information required for control may be shared using optical communication.

The primary-side sensing unit (220) may include a primary-side control power supply unit (210) that converts the voltage of the primary-side capacitor to supply control power. Alternatively, the primary-side control power supply unit (210) may not be included in the primary-side sensing unit (220) but may exist separately.

The secondary-side control unit (320) may include a secondary-side control power supply unit (310) that converts the voltage of the secondary-side capacitor to supply control power. At this time, the secondary-side control power supply unit (310) may convert an auxiliary voltage value (Vaux) of the auxiliary power supply (100) and supply control power to the secondary-side capacitor. Alternatively, the secondary-side control power supply unit (310) may not be included in the secondary-side control unit (320) but may exist separately.

The auxiliary power supply (100) may be included within the DC converter according to an embodiment of the present disclosure or may exist separately externally. The auxiliary power supply (100) may be comprised of a battery, a power converter, or a transformer, and may include a resistor for limiting inrush current and at least one or more switches. The auxiliary power supply (100) may be connected to the secondary-side port of the DC converter (Port 2 or Port 4 in FIG. 3), and may be connected to both ports or to only one port.

The method for initial charging of a DC/DC converter station with an input series-output parallel structure according to an embodiment of the present disclosure may include a step of charging a secondary-side capacitor (STEP 1), a step of charging a primary-side capacitor through switching (STEP 2), and an MVDC grid connection and auxiliary power disconnection step (STEP 3).

In the secondary-side capacitor charging step (STEP 1), power is supplied to the secondary-side control power supply unit (310) via the auxiliary power supply (100), and the secondary-side control unit (320) may be activated. At this time, the inrush current is limited through an initial charging resistor connected to the auxiliary power supply (100) in series, allowing the secondary-side capacitor to charge.

In the primary-side capacitor charging step (STEP 2) through switching, once the voltage of the secondary-side capacitor is charged to the same level as the voltage magnitude of the auxiliary power supply (100), the primary-side capacitor may be charged through power transfer from the secondary-side to the primary-side via a transformer. In other words, power may be transferred to the primary-side conversion unit through the secondary-side conversion unit, and at this time, charging may be performed while limiting the inrush current of the primary-side through soft switching. Once the voltage charging of the primary-side capacitor is completed, the primary-side sensing unit (220) is activated, enabling control of the DC converter. At this time, if the voltage magnitude of the primary-side capacitor is less than a voltage obtained by dividing the input voltage by the number of DC converters, additional power transfer control may be performed. This allows additional charging to occur through boosting the primary-side capacitor voltage until the voltage of the primary-side capacitor equals the input voltage divided by the number of DC converters. When the primary-side capacitor charging is finally complete, the sum of the input voltage magnitudes of multiple DC converters connected in series may equal the MVDC input voltage.

In the MVDC grid connection and auxiliary power disconnection step (STEP 3), if the primary-side capacitor charging is finally complete by a result of the STEP 2, no current flows even when the MVDC input voltage is connected, and therefore, the converter station may be connected to the MVDC grid, allowing the MVDC grid to be connected. When the MVDC grid is connected to the converter station, power transfer from the secondary side may be interrupted, and the auxiliary power supply (100) may be disconnected, allowing power to be transferred from the input side to the output side.

Figure 4:
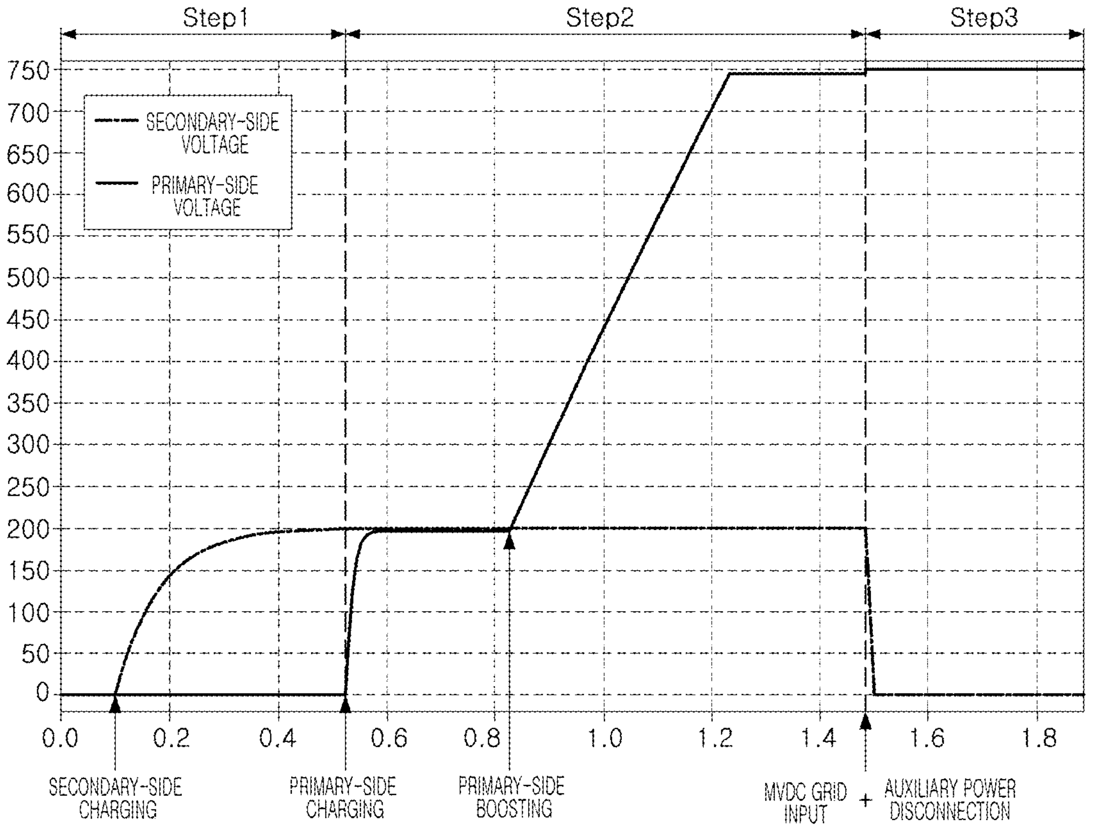
FIG. 4 is a diagram illustrating voltage waveforms of primary-side and secondary-side capacitors when performing an initial charging method according to an embodiment of the present disclosure.

FIG. 4 is a diagram illustrating the voltage waveforms of the primary-side and secondary-side capacitors when performing an initial charging method according to an embodiment of the present disclosure.

In the graph illustrated in FIG. 4, the voltage of the primary-side capacitor is depicted as a solid line, and the voltage of the secondary-side capacitor is depicted as a dashed line.

STEP 1, STEP 2, and STEP 3 illustrated in FIG. 4 may represent the steps described in FIG. 3. Referring to FIG. 4, it can be confirmed that charging of the secondary-side capacitor begins at 0.1 seconds in STEP 1, and the voltage of the secondary-side capacitor increases.

Furthermore, after 0.5 seconds elapsed, when STEP 2 begins, charging of the primary-side capacitor may begin. At this time, the charging of the primary-side capacitor is primarily completed, but since the voltage magnitude of the primary-side capacitor is smaller than the voltage magnitude obtained by dividing the input voltage by the number of DC converters, it can be confirmed that the primary-side voltage is boosted.

Furthermore, when the charging of the primary-side capacitor is finally completed and 1.5 seconds have passed, STEP 3 may be performed. At this time, when the MVDC grid is input to the converter station, the auxiliary power supply (100) may be disconnected. Referring to FIG. 4, it can be confirmed that the voltage of the secondary-side capacitor decreases again as the auxiliary power supply (100) is disconnected. At this time, the charging of the secondary-side capacitor via the auxiliary power supply (100), the disconnection of the auxiliary power supply (100), and the input of the MVDC grid may be performed by the higher-level control unit described in FIG. 2.

Figure 5:
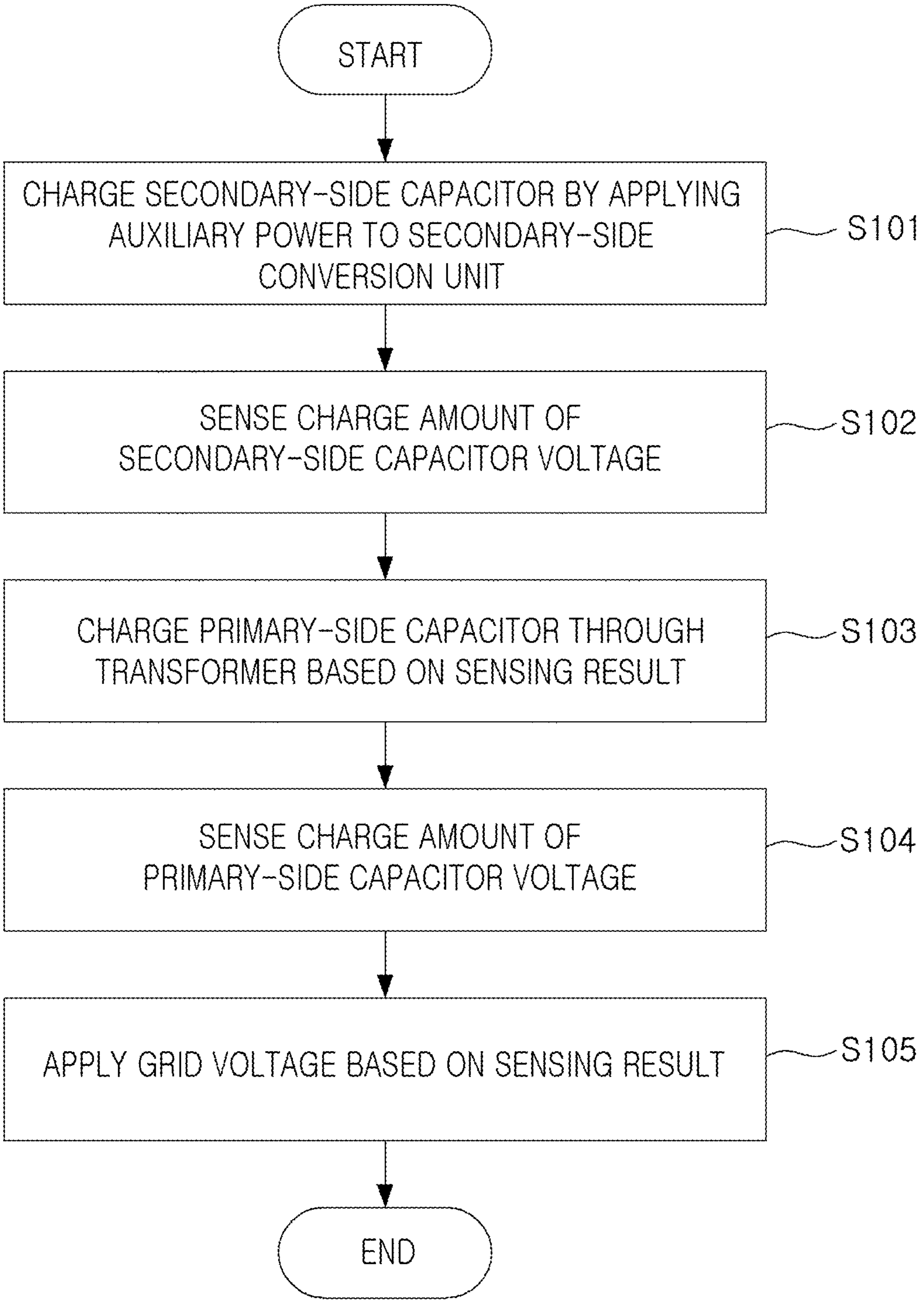
FIG. 5 is a flowchart illustrating a method for initial charging of a DC/DC converter station with an input series-output parallel structure according to an embodiment of the present disclosure.

FIG. 5 is a flowchart illustrating a method for initial charging of a DC/DC converter station with an input series-output parallel structure according to an embodiment of the present disclosure. The contents described with respect to FIGS. 1 through 4 may also be equally applied to FIG. 5.

According to an embodiment of the present disclosure, a method for initial charging of a DC/DC converter station with an input series-output parallel structure may include a step (S101) in which auxiliary power (100) is applied to the secondary-side conversion unit of a DC converter within the converter station to charge the secondary-side capacitor. At this time, the step S101 may be performed by limiting the inrush current through an initial charging resistor connected in series to the auxiliary power supply (100). The step S101 may be performed through a higher-level control unit.

In addition, when power is supplied to the secondary-side control power supply unit (310) via the auxiliary power supply (100) and the secondary-side control unit (320) is activated, the charge amount of the secondary-side capacitor voltage may be sensed through the secondary-side control unit (320) (S102).

Furthermore, based on the sensing result of step S102, the primary-side capacitor may be charged through a transformer (S103). At this time, in the step S103, if the voltage of the secondary-side capacitor is equal to the voltage of the auxiliary power supply, power is transferred from the secondary-side conversion unit to the primary-side conversion unit via the transformer, and the primary-side capacitor may be charged with the transferred power. Furthermore, the step S103 may charge the primary-side capacitor by limiting the inrush current through soft switching.

Once the voltage of the primary-side capacitor is charged and the voltage charging of the primary-side capacitor is completed, the primary-side sensing unit (220) may be activated, and the primary-side sensing unit (220) may sense the charge amount of the primary-side capacitor (S104).

If the sensing result of step S104 indicates that the magnitudes of the primary-side capacitor voltage and the secondary-side capacitor voltage are not equal, the primary-side capacitor voltage charging may be performed again. At this time, only when the magnitudes of the primary-side capacitor voltage and the secondary-side capacitor voltage are equal, and only when the magnitude of the primary-side capacitor voltage is equal to a value obtained by dividing the grid voltage by the number of DC converters in the converter station, the auxiliary power supply (100) may be disconnected by opening the switch by the higher-level control unit, and the MVDC grid may be input (S105).

If the magnitude of the primary-side capacitor voltage is lower than the value obtained by dividing the grid voltage by the number of DC converters in the converter station, the primary-side capacitor voltage may be boosted through the power transfer by the transformer until the magnitude of the primary-side capacitor voltage becomes equal to the value obtained by dividing the grid voltage by the number of DC converters in the converter station.

While the illustrative methods of the present disclosure are presented as a series of operations for clarity of description, this is not intended to limit the order in which the steps are performed. If necessary, individual steps may be performed simultaneously or in different orders. To implement the method according to the present disclosure, additional steps may be included in addition to the steps illustrated, some steps may be excluded and the remaining steps may be included, or some steps may be excluded and additional steps may also be included.

The various embodiments of the present disclosure do not list all possible combinations but rather illustrate representative aspects of the present disclosure. The elements described in the various embodiments may be applied independently or in combinations of two or more.

Furthermore, the various embodiments of the present disclosure may be implemented using hardware, firmware, software, or combinations thereof. In the case of hardware implementation, the embodiments may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general processors, controllers, microcontrollers, microprocessors, or the like.

The scope of the present disclosure includes software or machine-executable instructions (for example, an operating system, an application, firmware, a program, and the like) that enable operations according to the methods of the various embodiments to be executed on a device or computer, and a non-transitory computer-readable medium storing such software, instructions or the like and executing the same on the device or computer.

The invention claimed is:

1. A method for initial charging of a DC/DC converter station with an input series-output parallel structure, the method comprising:

applying auxiliary power supply to a secondary-side conversion unit of a DC converter within the DC/DC converter station and charging a secondary-side capacitor within the secondary-side conversion unit;

sensing a charge amount of voltage of the secondary-side capacitor;

charging a primary-side capacitor within a primary-side conversion unit of the DC converter through a transformer within the DC converter based on a result of sensing the charge amount of the voltage of the secondary-side capacitor;

sensing a charge amount of voltage of the primary-side capacitor; and applying a grid voltage to the DC/DC converter station based on a result of sensing the charge amount of the voltage of the primary-side capacitor, wherein the applying the grid voltage is configured such that the grid voltage is applied only when a magnitude of the voltage of the primary-side capacitor is equal to a value obtained by dividing the grid voltage by a number of DC converters within the DC/DC converter station.

2. The method of claim 1, wherein the charging the secondary-side capacitor is configured such that the secondary-side capacitor is charged by limiting inrush current through an initial charging resistor connected to the auxiliary power supply in series.

3. The method of claim 1, wherein the charging the primary-side capacitor includes, when the voltage of the secondary-side capacitor is equal to a voltage magnitude of the auxiliary power supply, transferring power from the secondary-side conversion unit to the primary-side conversion unit via the transformer; and charging the primary-side capacitor using the transferred power, and the charging the primary-side capacitor is configured such that the primary-side capacitor is charged by limiting inrush current through soft switching.

4. The method of claim 3, wherein the applying the grid voltage is configured such that, when the magnitude of the voltage of the primary-side capacitor is lower than the value obtained by dividing the grid voltage by the number of the DC converters in the DC/DC converter station, the voltage of the primary-side capacitor is boosted through a power transfer by the transformer until the magnitude of the voltage of the primary-side capacitor becomes equal to the value obtained by dividing the grid voltage by the number of the DC converters in the DC/DC converter station.

5. A DC/DC converter station having an input series-output parallel structure, the DC/DC converter station comprising:

a plurality of DC converters with input terminals connected to each other in series and output terminals connected to each other in parallel;

an auxiliary power supply connected to at least one secondary-side conversion unit among the plurality of DC converters and supplying initial charging power; and a control unit controlling the auxiliary power supply and performing initial charging of the DC/DC converter station, wherein the control unit is configured to charge a secondary-side capacitor within the secondary-side conversion unit via the auxiliary power supply and to charge a primary-side capacitor within a primary-side conversion unit within the DC converter via a transformer within the DC converter based on voltage of the secondary-side capacitor.

6. The DC/DC converter station of claim 5, wherein the auxiliary power supply is connected to an initial charging resistor for limiting inrush current in series.

7. The DC/DC converter station of claim 5, wherein the control unit is configured to disconnect the auxiliary power supply from the DC/DC converter station and apply grid voltage based on completion of charging of the primary-side capacitor.

8. The DC/DC converter station of claim 7, wherein the control unit is configured to boost voltage of the primary-side capacitor through power transfer by the transformer until a voltage magnitude of the primary-side capacitor becomes equal to a value obtained by dividing the grid voltage by a number of DC converters in the DC/DC converter station, when the voltage magnitude of the primary-side capacitor is lower than a value obtained by dividing a magnitude of the grid voltage by the number of the DC converters in the DC/DC converter station.

* * * * *